United States Patent
Bengtsson et al.

(10) Patent No.: US 10,236,959 B2
(45) Date of Patent: Mar. 19, 2019

(54) METHOD FOR TRANSMITTING DATA BETWEEN A USER EQUIPMENT AND A BASE STATION IN A WIRELESS RADIO NETWORK

(71) Applicant: Sony Corporation, Tokyo (JP)

(72) Inventors: Erik Bengtsson, Eslöv (SE); Zhinong Ying, Lund (SE)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 15/115,709

(22) PCT Filed: Dec. 10, 2014

(86) PCT No.: PCT/EP2014/077153
§ 371 (c)(1),
(2) Date: Aug. 1, 2016

(87) PCT Pub. No.: WO2015/113684
PCT Pub. Date: Aug. 6, 2015

(65) Prior Publication Data
US 2017/0012686 A1    Jan. 12, 2017

(30) Foreign Application Priority Data
Jan. 30, 2014   (EP) ..................................... 14153313

(51) Int. Cl.
*H04B 7/04* (2017.01)
*H04B 7/06* (2006.01)
*H04L 5/00* (2006.01)

(52) U.S. Cl.
CPC ............... *H04B 7/061* (2013.01); *H04B 7/04* (2013.01); *H04B 7/0684* (2013.01);
(Continued)

(58) Field of Classification Search
CPC ........ H04B 7/061; H04B 7/0684; H04B 7/04; H04B 7/0608; H04L 5/0055; H04L 5/0057
See application file for complete search history.

(56) References Cited

U.S. PATENT DOCUMENTS

2007/0142074 A1    6/2007  Black et al.
2009/0175220 A1*   7/2009  Yi ........................ H04B 7/0602
                                                  370/328
(Continued)

FOREIGN PATENT DOCUMENTS

CN    101297507 A    10/2008
CN    101341671 A     1/2009
(Continued)

OTHER PUBLICATIONS

International Search Report and Written Opinion; dated Feb. 25, 2015; issued in International Patent Application No. PCT/EP2014/077153.

*Primary Examiner* — Wayne H Cai
(74) *Attorney, Agent, or Firm* — Tucker Ellis LLP

(57) ABSTRACT

The present invention relates to a method for transmitting data between a user equipment (15) and a base station (11) in a wireless radio network (10). The user equipment (15) comprises at least a first antenna (16) and a second antenna (17). The base station (11) comprises a plurality of antennas (12) for transmitting radio frequency signals between the base station (11) and the user equipment (15). According to the method, a first training signal is transmitted from the user equipment (15) to the base station (11) via the first antenna (16) at a first time period. Furthermore, a second training signal is transmitted from the user equipment (15) to the (Continued)

base station (11) via the second antenna (17) at a second time period different to the first time period. For each antenna (12) of the base station (11) a corresponding first configuration parameter is determined based on the first training signal and a corresponding second configuration parameter is determined based on the second training signal. Furthermore, first downlink data (DL1) is transmitted from the base station (11) to the user equipment using the first configuration parameters and simultaneously second downlink data (DL2) are transmitted from the base station (11) to the user equipment (15) using the second configuration parameters. Then, a first signal quality parameter of the first downlink data (DL1) is determined and a second signal quality parameter of the second downlink data (DL2) is determined. Based on the determined first and second signal quality parameters, an antenna of the first and second antennas (16, 17) of the user equipment (15) is selected for transmission of uplink data (UL1, UL2) from the user equipment (15) to the base station (11).

12 Claims, 3 Drawing Sheets

(52) U.S. Cl.
CPC .......... *H04L 5/0055* (2013.01); *H04L 5/0057* (2013.01); *H04B 7/0608* (2013.01)

(56) References Cited

U.S. PATENT DOCUMENTS

| | | |
|---|---|---|
| 2010/0103877 A1 | 4/2010 | Wang et al. |
| 2010/0322328 A1 | 12/2010 | Schirmacher et al. |
| 2011/0092241 A1 | 4/2011 | Kawai et al. |
| 2012/0328034 A1 | 12/2012 | Nabar et al. |
| 2013/0129010 A1* | 5/2013 | Xi ..................... H04B 7/0617 375/295 |
| 2013/0265890 A1* | 10/2013 | Ali ..................... H01Q 1/246 370/252 |

FOREIGN PATENT DOCUMENTS

| | | |
|---|---|---|
| CN | 102571173 A | 7/2012 |
| WO | 2011053220 A1 | 5/2011 |

\* cited by examiner

METHOD FOR TRANSMITTING DATA BETWEEN A USER EQUIPMENT AND A BASE STATION IN A WIRELESS RADIO NETWORK

FIELD OF THE INVENTION

The present invention relates to a method for transmitting data between a user equipment and a base station in a wireless radio network. Especially, the present invention relates to a method for transmitting data between a base station and a user equipment comprising a plurality of antennas for transmitting radio frequency signals according to a so called multiple-input and multiple-output (MIMO) technology or according to a so called diversity mode. The present invention relates furthermore to a base station and a user equipment which implement the method.

BACKGROUND OF THE INVENTION

For increasing data transmission performance and reliability, a so called multiple-input and multiple-output technology (MIMO) may be used in wireless radio frequency telecommunications for transmitting information between a base station and a user equipment. The MIMO technology relates to the use of multiple send and receive antennas for a wireless communication at a base station and/or at a user equipment. The MIMO technology forms the basis for coding methods which use the temporal as well as the spatial dimension for transmitting information and enables therefore a space and time coding. Thus, a quality and data rate of the wireless communication may be increased.

In a so called massive MIMO system, a plurality of user equipments may be arranged within a cell served by a base station having a plurality of antennas. In the massive MIMO system, a configuration of individual antenna transceivers of the base station may vary depending on the location of each of the user equipments and transmission conditions in an environment of the base station and the user equipment.

The massive MIMO system may be used in connection with a time division duplex (TDD) system in which a transmission of an information stream between the base station and a user equipment is split up in time slots. Different time slots for uplink (UL) data communications and downlink (DL) data communications may be provided for communicating information from the user equipment up to the base station and for communicating information from the base station down to the user equipment. In the massive MIMO system, there is a need for an additional time slot which may be called "header" for transmitting a training signal or training sequence from the user equipment to the base station. Based on the received training signal, the base station may configure the transceivers of its antenna array. Thus, high antenna gain for the payload transmitted in the following time slots can be achieved. The payload may be transmitted in a number of uplink and downlink time slots. However, when the user equipment is moving, the channel quality may degrade due to a change of the spatial arrangement of the base station and/or the user equipment. Therefore, further training signals may be transmitted and the configuration of the transceivers updated.

Typically, massive MIMO systems are expected in buildings such as offices, shopping malls and so on. In this environment a large number of user equipments may be expected. However, due to the space coding by an individual configuration of the antenna parameters for each user equipment, even in this environment a high data throughput and a high data reliability may be achieved with the MIMO technology. For further enhancement, a so called 3D-MIMO system may be used in which a plurality of base stations comprising each a plurality of antennas cooperate for enabling an even more enhanced space coding of the transmitted information.

Many user equipments, for example handsets like mobile phones, provide two or even more antennas for cellular communication. The antennas of the user equipment are typically arranged spaced apart from each other at or within the housing of the user equipment, e.g. one antenna at a top and one at a bottom of the user equipment. For example, two antennas may be used in two different modes for the downlink (DL) communication, either in a diversity mode or in a MIMO mode. In the diversity mode the base station sends a single radio frequency signal and both antennas are supposed to receive it. If one of the antennas happens to be in a fading dip or if the user covers the one antenna, the other antenna still may have contact with the base station and the reception continues. The diversity mode is also called rank 1 mode. In the diversity mode the second antenna may be seen as a backup antenna. In the MIMO mode, which is also called rank 2 mode, the base station sends two different space coded signals on the very same frequency channel. Thus, the data rate may be up to two times higher. The two different radio frequency signals may be received at the two spatially separated antennas of the user equipment. A beam forming or a focusing of radio frequency signals, such that one of the two different signals may be received by a first of the two antennas of the user equipment and the other of the two different signals may be received at the same time by the other of the two antennas of the user equipment may be accomplished by the multiple antennas of the base station or the base stations operating according to the above-described massive MIMO or 3D-MIMO technology. As described above, in scenarios with rich scattered environments or a lot of user equipments, it is not possible to predict how to feed all the antennas of the base station to provide the required focusing of the radio frequency energy. Therefore, each user equipment needs to send a training sequence and then for example an amplitude and a phase for each antenna of the base station may be determined such that a radio frequency signal may be sent focused to the antenna of the user equipment from which the training sequence has been sent.

The configuration parameters for the downlink communication may be achieved based on the training sequence received in the uplink based on a channel reciprocity. With a rising transmission frequency and in rich environment scenarios with a lot of reflections and no line of sight (LOS), e.g. in indoor offices, the focusing may be very narrow, actually narrow enough to only cover one of the antennas of the user equipment. For example, the focus may be only a tenth of the wavelength of the transmission frequency. Therefore, for each antenna that needs to be covered by a beam formed by the base station, there may be a need to transmit a training sequence and therefore a transmitter for each antenna of the user equipment is needed. However, in a typical user equipment with two antennas, for cost optimization only a single transmitter may be provided, whereas two receivers are usually foreseen to enable the above-described diversity mode. Therefore, there is a need for a method enabling a transmission of data between the user equipment and the base station according to the above-described MIMO technology in a massive MIMO or 3D-MIMO system without increasing the complexity and cost of the user equipment.

SUMMARY OF THE INVENTION

According to the present invention, this object is achieved by a method for transmitting data between a user equipment and a base station in a wireless radio network as defined in claim 1, a base station for a wireless radio network as defined in claim 11, a user equipment for a wireless radio network as defined in claim 13, and a method for transmitting data between a user equipment and a base station in a wireless radio network as defined in claim 16. The dependent claims define preferred and advantageous embodiments of the invention.

According to an aspect of the present invention, a method for transmitting data between a user equipment and a base station in a wireless radio network is provided. The user equipment comprises at least a first antenna and a second antenna for transmitting radio frequency signals between the user equipment and the base station. The user equipment may have more than two antennas and in this case the described method may be adapted accordingly to use the more than two antennas. However, even if the user equipment has more than two antennas, the described method may also be performed using only two of the antennas. The base station comprises a plurality of antennas for transmitting radio frequency signals between the base station and the user equipment. The terms "transmit", "transmitting", etc. as used in the present description may relate to receiving information from the user equipment at the base station as well as sending information from the base station to the user equipment. Data transmitted from the base station to the user equipment will also be called downlink (DL) data or data sent in a downlink direction, and data transmitted from the user equipment to the base station will also be called uplink (UL) data or data sent in an uplink direction. According to the method, a first training signal from the user equipment to the base station is transmitted via the first antenna of the user equipment at a first time period. For each antenna of a subset of the plurality of antennas of the base station a corresponding first configuration parameter is determined based on the first training signal received at the corresponding antenna. Furthermore, a second training signal is transmitted from the user equipment to the base station via the second antenna of the user equipment at a second time period. The second time period is different to the first time period, for example the first time period may comprise a first time slot and the second time period may comprise a second time slot in a time division multiplex transmission scheme. For each antenna of the subset of the plurality of antennas of the base station a corresponding second configuration parameter is determined based on the second training signal received at the corresponding antenna. The first and second configuration parameters may be used for transmitting payload information blocks between the base station and the user equipment. The subset of the plurality of antennas may comprise those antennas of the plurality of antennas which are arranged to receive the first and second training signals from the user equipment. For example, if the antennas of the base station are arranged cylindrically, only a subset of the antennas may receive the training signals sent from the user equipment, whereas some other antennas may not receive the training signals. Furthermore, if a very large antenna array is used, only a part or a subset of the array of antennas may be used for a specific user equipment. However, the subset may also comprise all antennas of the plurality of antennas provided by the base station. As an example, the base station may comprise for example an antenna array of thirty to one hundred or even more antennas arranged for example in a matrix or cylindrically. Likewise, the user equipment may comprise two or more antennas, for example three or four antennas. In case the user equipment comprises more than two antennas, the described method may be adapted to the more antennas accordingly. Due to the configuration parameters determined for each antenna of the subset of the plurality of antennas, the base station may be enabled to communicate with each antenna of the user equipment according to the above-described MIMO technology. Therefore, according to the method, first downlink data are transmitted from the base station to the user equipment using the determined first configuration parameters for the antennas of the base station, and simultaneously second downlink data are transmitted from the base station to the user equipment using the determined second configuration parameters for the antennas of the base station. The first and second downlink data may be transmitted at the same frequency. By using the first configuration parameters for transmitting the first downlink data and by using the second configuration parameters for transmitting the second downlink data, a spatial coding may be provided such that the first downlink data may be received at a high quality at the first antenna of the user equipment and the second downlink data may be received at a high quality at the second antenna of the user equipment, although the first and second downlink data are transmitted at the same time. A leakage between the antennas of the user equipment may be handled by coding such that the user equipment is able to separate the first and second data.

In a diversity mode, the first downlink data may comprise the same data as the second downlink data, and the user equipment may select either the first downlink data or the second downlink data for a further processing depending on which downlink data provides the better reception quality. Additionally or as an alternative, the signals of the first and second downlink data may also both be received and then combined to provide the downlink data for the further processing. Therefore, in the diversity mode, a high transmission quality and reliability can be provided, even if for example one or both of the antennas of the user equipment is/are covered or has/have a degraded reception quality, for example due to a user holding the user equipment and disturbing therefore the reception at the antenna(s). In a MIMO mode, the first downlink data may be different from the second downlink data and both data may be processed in the user equipment after reception.

Therefore, in the MIMO mode, a higher data rate, for example a data rate up to two times higher via two antennas, may be achieved.

According to the method, a first signal quality parameter of the first downlink data received at the user equipment is determined and a second signal quality parameter of the second downlink data received at the user equipment is determined. Based on the determined first quality parameter and second quality parameter, one antenna of the first and second antennas of the user equipment is selected for a transmission of uplink data from the user equipment to the base station. In other words, according to the above-described method, a downlink communication supporting either the MIMO mode or the diversity mode is enabled with accurately adapted configuration parameters for the antennas of the base station to focus at a plurality of antennas of the user equipment. Furthermore, in uplink direction a selection diversity or switched diversity may be realized. An uplink communication from either one of the antennas of the user equipment is provided with a high quality due to appropriate configuration of the antennas of the base station.

Furthermore, the above-described method may be realized with only one transmitter or sending unit within the user equipment, as the first training signal and the second training signal are sent at separate time periods. Therefore, the above-described method may be realized at low cost in present user equipment designs.

According to an embodiment, the step of selecting an antenna of the user equipment for transmitting uplink data is performed by the user equipment. The base station may listen on both channels for uplink data coming form the first antenna or the second antenna of the user equipment. However, there will be only uplink data from either the first antenna or the second antenna. Therefore, the base station will receive uplink data on only one channel. Such an arrangement may be called an open loop antenna selection, as the base station is not involved in or informed about antenna selection for the uplink data. No additional protocol elements and protocol overhead for synchronizing the user equipment and the base station are needed.

According to another embodiment, the selection of an antenna of the first and second antennas of the user equipment for a transmission of uplink data is performed by the user equipment, and the selected antenna is notified from the user equipment to the base station. As described above, the base station is not involved in the selection process and therefore this embodiment represents also an open loop process. However, by notifying the base station about the selection result, the reception of the uplink data may be realized more efficiently within the base station.

According to a further embodiment, for selecting an antenna of the user equipment for transmission of uplink data, a preferred antenna of the first and second antennas of the user equipment for a transmission of uplink data is selected by the user equipment based on the determined first and second signal quality parameters. The preferred antenna is notified from the user equipment to the base station, and the base station may acknowledge to the user equipment that the base station excepts the preferred antenna of the user equipment to be used as the selected antenna for the transmission of uplink data from the user equipment to the base station. In other words, the user equipment requests at the base station an allowance for selecting an antenna which should be used for the transmission of uplink data. Upon acknowledgement from the base station, the user equipment may use the selected antenna. Therefore, a closed communication loop is provided and both, the base station and the user equipment, are involved in the selection process.

According to yet another embodiment, the first and second signal quality parameters are transmitted from the user equipment to the base station. In the base station, an antenna of the first and second antennas of the user equipment is selected based on the first and second signal quality parameters. The selected antenna is notified from the base station to the user equipment. In other words, the base station controls which antenna of the user equipment is to be used. This enables the base station to select an antenna taking additionally other conditions within a cell served by the base station into account, for example communication channels to other user equipments within the cell.

According to another embodiment, the user equipment comprises a sending unit and a switch configured for selectively coupling either the first antenna or the second antenna to the sending unit. In case, the user equipment has more than two antennas, the switch may be configured for selectively coupling the sending unit to every single one of the more than two antennas. Furthermore, the user equipment may comprise more than one sending units, but less sending units than antennas. In this case, the switch may be configured for selectively coupling each of the antennas to at least one of the sending units such that in a time multiplexed manner each antenna may be coupled to a sending unit. However, this implies also that it is not possible to couple all antennas at the same time to a corresponding sending unit. According to this embodiment, for transmitting the first training signal from the user equipment to the base station, the sending unit is coupled to the first antenna via the switch during the first time period. Then, during the second time period, the sending unit is coupled to the second antenna via the switch for transmitting the second training signal. By coupling the sending unit in a time multiplexed manner to the first and second antenna, or by coupling multiple sending units in a multiplexed time manner to a plurality of antennas of the user equipment, a lower number of sending units than antennas is needed to accomplish the above-described method. Especially, only one sending unit may be needed to serve the first and second antenna and even more antennas for transmitting corresponding training signals.

The first and second quality parameters may comprise each for example a bit error rate of the corresponding downlink data, a received signal strength indication of the corresponding downlink data, or a signal to noise ratio of the corresponding downlink data. The above-described quality parameters may be easily determined within the user equipment and provide reliable information concerning the transmission quality of the downlink data. Furthermore, the above-described quality parameters may be transmitted in a commonly known way in corresponding protocol data units to the base station for the above-described processing within the base station.

According to an embodiment, the configuration parameter determined for each antenna of the subset of the plurality of antennas of the base station may comprise for example an amplitude information, a phase information, a parameter pair comprising an amplitude information and associated phase information, a plurality of these parameters, or a signal intensity information of a signal intensity received at the corresponding antenna during receiving the corresponding training signal. However, the above-listed types of configuration parameters are only examples and the configuration parameters may comprise other or additional information for configuring the antennas of the base station to enable a data transmission according to the above-described MIMO transmission scheme. Furthermore, the phase and the amplitude information may be used directly to determine the configuration parameters of the antennas of the base station for receiving uplink data from the user equipment, as the training sequence has been sent in the same uplink direction. However, the configuration parameter for sending downlink data to the user equipment may be determined based on a Hermitian transpose of the configuration parameter for receiving uplink data. For example, if two uplink signal beams from the user equipment are received at the base station with different delay (phase), for sending downlink beams the phases need to be reversed as the beam with the shorter path comes first and both beams need to be aligned at the user equipment in the downlink direction.

According to another aspect of the present invention, a base station for a wireless radio network is provided. The base station comprises a plurality of antennas for transmitting radio frequency signals between the base station and a user equipment which comprises at least a first antenna and a second antenna for transmitting radio frequency signals between the user equipment and the base station. The base station comprises furthermore a processing device configured to receive a first training signal which has been sent from the user equipment to the base station via the first antenna at a first time period. The processing device is configured to determine for each antenna of a subset of the plurality of antennas of the base station a corresponding first configuration parameter based on the first training signal received at the corresponding antenna. Furthermore, the processing device is configured to receive a second training signal which has been sent from the user equipment to the base station via the second antenna at a second time period. The first time period and the second time period are different, for example, the second time period occurs after the first time period. The processing device determines for each antenna of the subset of the plurality of the antennas of the base station a corresponding second configuration parameter based on the second training signal received at the corresponding antenna. Then, first and second downlink data are transmitted from the base station to the user equipment simultaneously, i.e., there is at least an overlap of the transmission of the first downlink data and the transmission of the second downlink data. The first downlink data is transmitted using the determined first configuration parameters for the antennas of the base station. The second downlink data is transmitted using the second configuration parameters for the antennas of the base station. Due to the usage of the first and second configuration parameters for transmitting the first and second downlink data, a space coding of the first and second downlink data may be provided such that the first downlink data may be received with a high quality at the first antenna of the user equipment and the second downlink data may be received with a high quality at the second antenna of the user equipment. A signal processing for transmitting the first and second downlink data using the first and second configuration data (e.g. according a MIMO technology) may be performed in the analog or digital domain or a combination thereof. Therefore, for example, a part of a transceiver functionality of each antenna may be implemented digitally, for example in a signal processor or in the processing device, and the antennas and the remaining parts of the transceivers may be passive components. The first and second downlink data may comprise the same data in case the user equipment is operating in a diversity mode, whereas the first and second downlink data may comprise different data in case the user equipment is operating in a MIMO mode, thus increasing the data rate, e.g. up to two times. The processing device is furthermore configured to receive uplink data sent from the user equipment via either the first antenna or the second antenna. For receiving the uplink data sent via the first antenna, the processing device uses the first configuration parameters, and for receiving the uplink data sent from the second antenna of the user equipment, the processing device uses the second configuration parameter. However, the base station may be listening to uplink data using the first configuration parameter as well as the second configuration parameter at the same time to be able to receive the uplink data in both cases, i.e., in case the user equipment sends the uplink data via the first antenna or in case the user equipment sends the uplink data via the second antenna.

According to an embodiment, the base station is furthermore configured to perform any of the above-described methods and embodiments and comprises therefore the above-described advantages.

According to another aspect of the present invention, a user equipment for a wireless radio network is provided. The user equipment comprises at least a first antenna and a second antenna for transmitting radio frequency signals between the user equipment and the base station. The base station comprises a plurality of antennas for transmitting radio frequency signals between the base station and the user equipment. The user equipment comprises furthermore a processing device configured to send a first training signal to the base station via the first antenna at a first time period, and to send a second training signal to the base station via the second antenna at a second time period, which is different to the first time period. To accomplish this, the user equipment may comprise a single sending unit and a switch selectively coupling the sending unit to either the first antenna or the second antenna. The processing device is furthermore configured to receive first downlink data from the base station via the first antenna and to receive simultaneously second downlink data from the base station via the second antenna. Therefore, the user equipment may comprise two receiving units, one for each antenna. Furthermore, the processing device determines a first signal quality parameter of the received first downlink data and a second signal quality parameter of the received second downlink data. Then, based on the determined first and second signal quality parameters, the processing device sends uplink data via either the first antenna or the second antenna to the base station. For sending the uplink data, the processing device may configure the above-mentioned switch such that the single sending unit of the user equipment is either coupled to the first antenna or to the second antenna.

According to an embodiment, the user equipment is configured to perform the above-described method and the above-described embodiments of the method and comprises therefore the above-described advantages. The user equipment may comprise for example a mobile telephone, a mobile computer, a personal digital assistant or a tablet computer.

According to another embodiment, the base station may determine based on the received first and second training signals the corresponding first and second quality parameters and may select an antenna of the first and second antennas of the user equipment for a transmission of uplink data from the user equipment to the base station. Hence, the base station may determine which channel is the better by comparing the received training signals and may then demand the user equipment to use the corresponding antenna for coming uplink data.

Although specific features described in the above summary and the following detailed description are described in connection with specific embodiments and aspects of the present invention, it should be understood that the features of the exemplary embodiments and aspects may be combined with each other unless specifically noted otherwise.

BRIEF DESCRIPTION OF THE DRAWINGS

The present invention will now be described in more detail with reference to the accompanying drawings.

DETAILED DESCRIPTION OF PREFERRED EMBODIMENTS

In the following, exemplary embodiments of the present invention will be described in more detail. It is to be understood that the features of the various exemplary embodiments described herein may be combined with each other unless specifically noted otherwise. Same reference signs in the various drawings refer to similar or identical components. Any coupling between components or devices shown in the figures may be a direct or an indirect coupling unless specifically noted otherwise.

Figure 1:
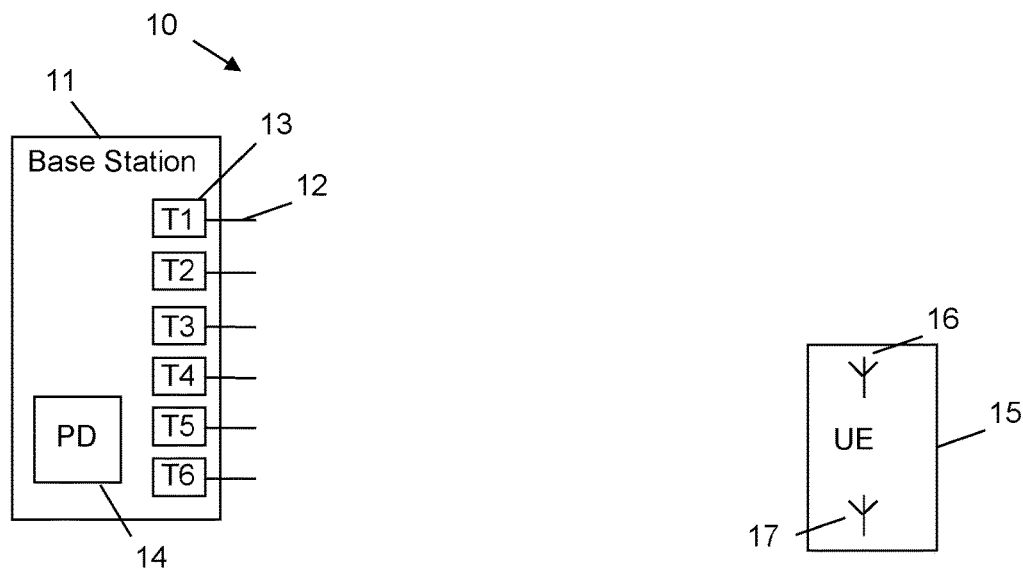
FIG. 1 shows schematically a base station and a user equipment according to embodiments of the present invention.

FIG. 1 shows a user equipment 15 arranged in an environment 10 of a base station 11. The base station 11 comprises a plurality of antennas 12 and associated transceivers 13. In FIG. 1 only six antennas 12 six transceivers 13 are shown for clarity reasons. However, these are only exemplary numbers and the base station 11 may comprise for example an array of 30 to 100 or even more antennas and associated transceivers arranged for example in a matrix or cylindrically. The user equipment 15 comprises two antennas 16 and 17. However, the user equipment 15 may comprise even more antennas, for example three or four. The base station 11 comprises furthermore a processing device (PD) 14 coupled to the transceivers 13 and adapted to configure the transceivers 13 for transmitting radio frequency signals between the base station 11 and the user equipment 15. The multiple antennas 12 and the transceivers 13 of the base station 11 may be used and configured such that the above-described multiple-input and multiple-output (MIMO) technology may be utilized for transmission of data between the base station and each of the antennas 16 and 17 of the user equipment 15. In other words, the antennas 12 and the transceivers 13 of the base station 11 may be configured such that they provide two communication channels between the base station 11 and the user equipment 15 separated by a space coding.

Figure 2:
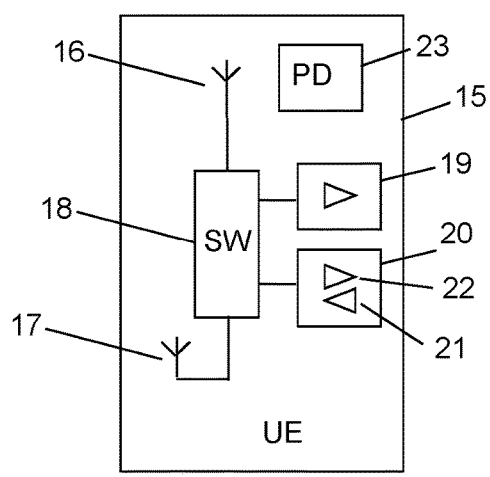
FIG. 2 shows schematically a user equipment according to an embodiment of the present invention in more detail.

FIG. 2 shows the user equipment 15 in more detail. The user equipment 15 comprises the two antennas 16 and 17 coupled via a switch 18 to a first receiver 19 and a transceiver 20 comprising a sender 21 and a second receiver 22. Furthermore, the user equipment 15 comprises a processing device (PD) 23 coupled to the switch 18 for controlling the switch. Under the control of the processing device 23, the switch 18 may couple for example the first antenna 16 to the first receiver 19, the second antenna 17 to the second receiver 22, and selectively the sender 21 to either the first antenna 16 or the second antenna 17. Thus, the two receivers 19 and 22 may continuously receive signals via the antennas 16 and 17, whereas only one antenna of the antennas 16 and 17 may be provided with a radio frequency signal from the sender or sending unit 21.

For setting up the above-described two communication channels between the base station 11 and the user equipment 15, the transceivers 13 have to be configured to provide a high quality transmission taking into account spatial information of the antennas 16 and 17 of the user equipment 15 with respect to the base station 11. For determining configuration parameter sets for the transceivers 13, a training signal or a training sequence of radio frequency signals may be transmitted from each of the antennas 16, 17 of the user equipment 15 to the base station 11. Based on the received training signal, corresponding configuration parameters for the transceivers 13 may be determined in the base station 11. However, when the user equipment 15 is moving, the configuration of the transceivers 13 has to be updated for the new position to avoid degradation of the transmission quality. Therefore, the training signals from the antennas 16, 17 have to be transmitted in regular terms, for example at beginning of each frame transmitted between the base station 11 and the user equipment 15.

A typical transmission frame used in wireless radio communication networks may comprise a header, an uplink part for transmitting data from the user equipment 15 to the base station 11, and a downlink part for transmitting data from the base station 11 to the user equipment 15. The above-described training signals may be transmitted in separate time slots for each antenna 16, 17 of each user equipment 15. To accomplish this with only one sending unit 21 of the user equipment 15, the method 30 described in FIG. 3 may be utilized by the base station 11 and the user equipment 15.

Figure 3:
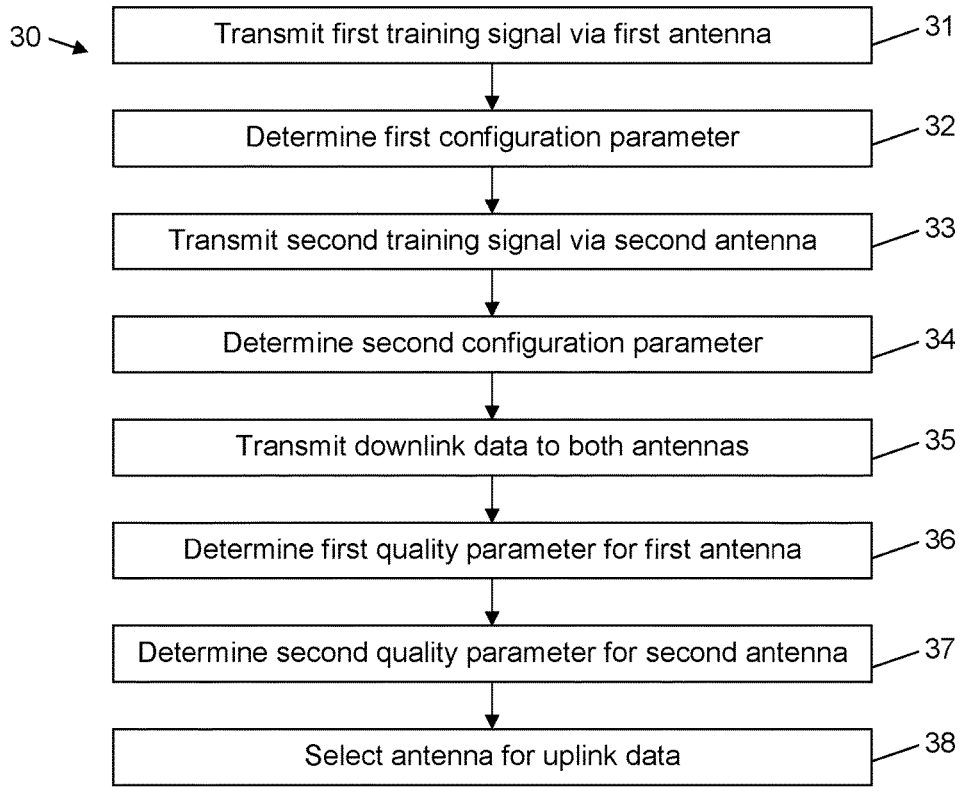
FIG. 3 shows a flowchart comprising method steps for transmitting data between the user equipment and the base station in a wireless radio network according to an embodiment of the present invention.

FIG. 3 shows method steps 31 to 38 of the method 30. In step 31 the processing device 23 of the user equipment 15 configures the switch 18 such that the first antenna 16 is coupled to the sending unit 21, and a first training signal is sent via the first antenna 16 to the base station 11 at a first time period or time slot within for example a header of a transmission frame. In step 32 the base station 11 determines for each antenna 12 of the base station 11 a corresponding first configuration parameter based on the first training signal received at the corresponding antenna 12. Next, the processing device 23 configures the switch 18 such that the sending unit 21 is coupled to the second antenna 17, and in step 33 a second training signal is sent via the second antenna 17 to the base station 11. The processing device 14 of the base station 11 determines for each antenna 12 of the base station 11 a corresponding second configuration parameter based on the second training signal received at the corresponding antenna (step 34). In step 35 the base station transmits downlink data via both channels to the user equipment 15. In other words, the base station 11 transmits first downlink data from the base station 11 to the user equipment 15 using the first configuration parameters for the antennas 12, and simultaneously the base station 11 transmits second downlink data to the user equipment 15 using the second configuration parameters. Due to the space coding via the first configuration parameters and the second configuration parameters, the first downlink data may be received at a high quality at the first antenna 16 and the second downlink data may be received at the second antenna 17. In steps 36 and 37 the base station determines for each of the received downlink data corresponding quality parameters indicating via a first quality parameter a reception quality at the first antenna and via a second quality parameter a reception quality of the second antenna. Based on the determined first and second signal quality parameters, either the first antenna 16 or the second antenna 17 is selected for a transmission of uplink data from the user equipment 15 to the base station 11 (step 38).

As described above in the section relating to the background of the invention, the user equipment 15 may operate in either the diversity mode which is also called rank 1 mode, or in the MIMO mode, which is also called rank 2 mode. In the diversity mode, the base station transmits the same data as the first downlink data and the second downlink data. In other words, the same data is transmitted via two channels from the base station 11 to the user equipment 15 and received two times at the user equipment 15, via the first antenna 16 and via the second antenna 17. In case one of the channels is disturbed, for example due to a user covering with the user's hand one of the antennas 16, 17, the downlink data can still be received at the user equipment 15. In the MIMO mode, the base station 11 transmits different downlink data and therefore the amount of transmitted data may be doubled.

The above-described data transmission between the user equipment 15 and the base station 11 will be described in more detail in exemplary embodiments in connection with FIGS. 4-7 in the following. Especially, the above-described step 38 of selecting an antenna for a transmission of uplink data, will be described in more detail in the various exemplary embodiments.

Figure 4:
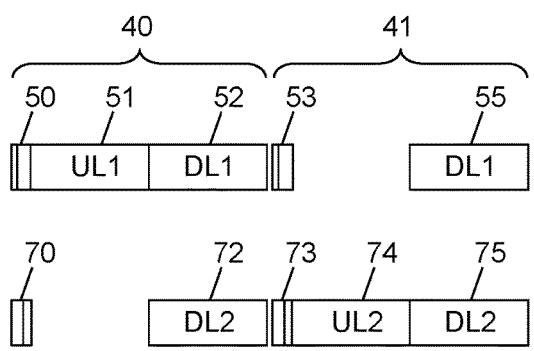
FIGS. 4-7 show schematically data transmissions between a user equipment and a base station according to embodiments of the present invention.

In FIG. 4 a first embodiment is shown in which the selection of the antenna to be used for the uplink data transmission is performed in the user equipment 15, and the base station 11 is notified about the selection. In FIG. 4 two transmission frames 40 and 41 for each channel are shown. Each channel relates to a space coded communication between the base station 11 and each of the antennas 16, 17 of the user equipment 15. Data transmissions in the first channel are identified with the post fix "1" and data communications via the second channel are identified with the post fix "2". Due to the space coding, a frame on the first channel may be transmitted at the same time as a frame on the second channel. Therefore, in FIG. 4 the horizontal direction indicates the time, the first line of boxes relates to the first channel, and the second line of boxes relates to the second channel.

The transmission starts with a transmission of a header information 50 on the first channel and a header information 70 on the second channel. The headers of each channel are synchronized such that time slots within the header may be separately used by individual user equipments and individual antennas of the user equipments. Therefore, there is a dedicated time slot within the header 50 for the transmission of the first training signal from the first antenna 16, and a dedicated time slot for transmitting the second training signal from the second antenna 17. As described above, the processing device 23 configures the switch 18 such that the sending unit 21 is coupled to the first antenna 16 and the first training signal is sent within the header 50 as indicated in FIG. 4. Then, the processing device 23 configures the switch 18 such that the sending unit 21 is coupled to the second antenna 17 and the second training sequence is sent in the header 70 as indicated in FIG. 4. Next, the processing device 23 configures the switch 18 to couple the sending unit 21 with the first antenna 16 and first uplink data (UL1) 51 is transmitted from the user equipment 15 to the base station 11. The first uplink data 51 comprises an information informing the base station which antenna is to be used for the next frame 41. In this case, for example, the user equipment 15 may have determined based on a quality of previously received (not shown) downlink data to select the second antenna 17 for the next transmission of uplink data. Next, the base station 11 transmits first and second downlink data (DL1, DL2) 52, 72 via both channels in a space coded manner to the user equipment 15. The first and second downlink data may comprise the same data or different data depending on the used transmission mode, diversity mode or MIMO mode. The next frame 41 starts again with headers 53 and 73 for each channel comprising first and second training signals to update the first and second configuration parameters for the antennas 12. Then, as notified before, the user equipment 15 couples the sending unit 21 to the second antenna 17 and transmits uplink data (UL2) 74 via the second channel to the base station. Again, the uplink data (UL2) 74 may contain an information for the base station which channel will be used by the user equipment 15 in the next (not shown) frame. The channel or antenna which will be used for the uplink data may be selected based on quality parameters determined for the received first and second downlink data. For example, a first signal quality parameter of the first downlink data 52 may be determined and a second signal quality parameter of the second downlink data 72 may be determined. The first and second signal quality parameters may be compared and the channel having the better quality may be selected for transmitting next uplink data. After having communicated the selected channel in uplink data 74, this channel may be used in a further (not shown) time frame. Then, the base station 11 transmits simultaneously first and second downlink data (DL1, DL2) 55, 75 as described above, and the user equipment 15 may determine corresponding signal quality parameters for a future antenna reselection.

Figure 5:
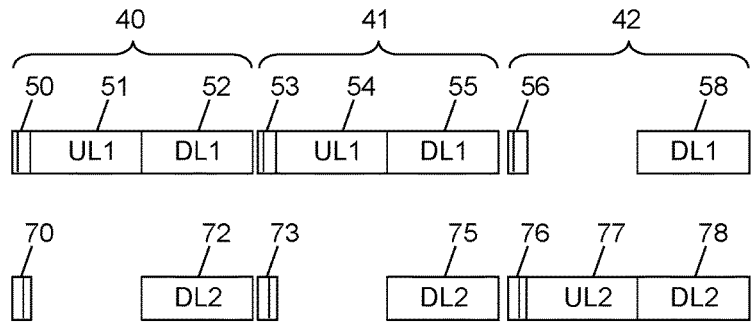

FIG. 5 shows a further embodiment of the method described in connection with FIG. 3. In the embodiment shown in FIG. 5, the user equipment 15 proposes one of the antennas 16 or 17 for uplink data transmission, and the base station 11 may acknowledge the request such that a closed communication loop for the antenna selection may be provided. As described in connection with FIG. 4, in the headers 50 and 70 of the first frame 40 the first and second training signals are transmitted. Based on quality parameters determined for downlink data received in a previous (not shown) frame, the user equipment 15 may propose one of the antennas 16 and 17 to be used for a future uplink communication, for example, the user equipment 15 may propose to use the second antenna 17 in the future. This proposal is communicated to the base station 11 via the uplink data (UL1) 51. Next, the base station 11 transmits downlink data (DL1, DL2) 52 and 72 on both channels to the user equipment 15 which may be used for determining future antenna selections. In the next frame 41 the user equipment still transmits uplink data (UL1) 54 via the first antenna 16, as so far no acknowledgement for changing the sending antenna has been received from the base station 11. In the downlink data (DL1, DL2) 55, 75 of the frame 41 the base station 11 may acknowledge the proposed selection of the second antenna 17 as the sending antenna. Therefore, in the next frame 42 after the headers 56 and 76 have been transmitted, the user equipment 15 sends uplink data (UL 2) 77 via the second antenna 17 to the base station 11.

Figure 6:
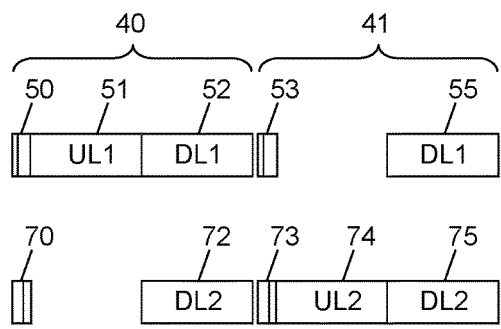

FIG. 6 shows a further embodiment for an antenna selection in which the user equipment 15 may reselect the antenna for sending uplink data to the base station without informing the base station 11. Therefore, the communication shown in FIG. 6 mainly corresponds to the communication shown in FIG. 4. The only difference is that the user equipment 15 does not notify in its uplink data (UL1 or UL2) 51 or 74 the next channel which will be used for the next uplink data. Therefore, the base station 11 has to listen to both channels always and has to take the uplink data from the channel at which it is provided. It is to be noticed that there will be data only on one of the channels.

Figure 7:
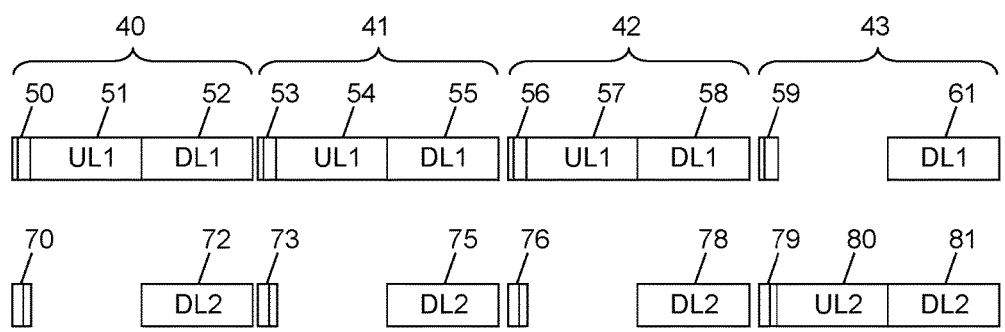

FIG. 7 shows a further embodiment for antenna selection in which the base station 11 performs the antenna selection and informs the user equipment 15 accordingly. As described above, in frame 40 the first and second training signals are transmitted from the user equipment 15 in the headers 50, 70 to the base station 11. Next, uplink data (UL1) 51 is transmitted from the user equipment 15 to the base station via the first channel. Then, the base station transmits on both channels downlink data (DL1, DL2) 52, 72 to the user equipment 15. The user equipment 15 determines a first signal quality parameter of the first downlink data (DL1) 52 and a second signal quality parameter of the second downlink data (DL2) 72. In the next frame 41, after having transmitted the first and second training signals in the headers 53 and 73, the user equipment 15 transmits in the uplink data (UL1) 54 on the first channel via the first antenna 16 the determined first and second signal quality parameters to the base station 11. The base station 11 transmits downlink data (DL1, DL2) 55 and 75 to the user equipment 15 which may be used by the user equipment 15 to determine further signal quality parameters. In the next frame 42, again training signals may be transmitted in the headers 56 and 76 and uplink data (UL1) 57 may be transmitted via the first antenna 16 to the base station 11. Based on the first and second quality parameters received in frame 41, the base station 11 has in the meantime determined which communication channel provides the better performance and may therefore instruct the user equipment 15 to use the second antenna 17 for sending uplink data in the future. This information may be transmitted to the user equipment 15 in the downlink data (DL1, DL2) 58, 78 of frame 42. Therefore, in the next frame 43, after the first and second training signals have been transmitted in the headers 59, 79, the user equipment 15 configures the switch 18 to couple the sending unit 21 with the second antenna 17 and transmits the uplink data (UL2) 80 via the second antenna 17 to the base station 11. Finally, the base station 11 may transmit downlink data (DL1, DL2) 61, 81 to the user equipment 15 simultaneously via the two channels.

The invention claimed is:

1. A method for transmitting data between a user equipment and a base station in a wireless radio network, wherein the user equipment comprises at least a first antenna and a second antenna for transmitting radio frequency signals between the user equipment and the base station, and wherein the base station comprises a plurality of antennas for transmitting radio frequency signals between the base station and the user equipment, the method comprising:
    transmitting a first training signal from the user equipment to the base station via the first antenna at a first time period on a first communication channel;
    determining a first configuration parameter for each antenna of a subset of the plurality of the antennas of the base station based on the first training signal received at the corresponding antenna;
    transmitting a second training signal from the user equipment to the base station via the second antenna at a second time period different than the first time period on a second communication channel different than the first communication channel;
    determining a second configuration parameter for each antenna of the subset of the plurality of the antennas of the base station based on the second training signal received at the corresponding antenna;
    transmitting first downlink data from the base station to the user equipment by the antennas of the subset being configured using the first configuration parameter, and simultaneously transmitting second downlink data from the base station to the user equipment by the antennas of the subset being configured using the second configuration parameter;
    determining at the user equipment a first signal quality parameter of the first downlink data received at the first antenna of the user equipment;
    determining at the user equipment a second signal quality parameter of the second downlink data received at the second antenna of the user equipment; and
    selecting by the user equipment, based on the determined first and second signal quality parameters, an antenna of the first and second antennas of the user equipment for a transmission of uplink data from the user equipment to the base station.

2. The method according to claim 1, further comprising:
    notifying, from the user equipment to the base station, the selected antenna of the user equipment.

3. The method according to claim 1, wherein the step of selecting an antenna of the user equipment comprises:
    selecting by the user equipment, based on the determined first and second signal quality parameters, a preferred antenna of the first and second antennas of the user equipment for a transmission of uplink data from the user equipment to the base station,
    notifying, from the user equipment to the base station, the preferred antenna of the user equipment, and
    acknowledging, from the base station to the user equipment, that the base station has accepted the preferred antenna of the user equipment to be used as the selected antenna for the transmission of uplink data from the user equipment to the base station.

4. The method according to claim 1, wherein the first downlink data is the same as the second downlink data.

5. The method according to claim 1, wherein the first downlink data is different from the second downlink data.

6. The method according to claim 1, wherein the user equipment comprises a sending unit and a switch configured for selectively coupling either the first antenna or the second antenna to the sending unit,
    wherein the step of transmitting the first training signal comprises:
        coupling the sending unit to the first antenna via the switch, and
    wherein the step of transmitting the second training signal comprises:
        coupling the sending unit to the second antenna via the switch.

7. The method according to claim 1,
    wherein determining the first quality parameter comprises at least one of a group consisting of:
        determining a bit error rate of the first downlink data,
        determining a received signal strength indication of the first downlink data, and
        determining a signal to noise ratio of the first downlink data, and
    wherein determining the second quality parameter comprises at least one of a group consisting of:
        determining a bit error rate of the second downlink data,
        determining a received signal strength indication of the second downlink data, and
        determining a signal to noise ratio of the second downlink data.

8. The method according to claim 1, wherein the first and/or second configuration parameter comprises at least one of a group consisting of:
    an amplitude information,
    a phase information,
    a parameter pair comprising an amplitude information and an associated phase information, and
    a plurality of the parameter pairs.

9. A base station for a wireless radio network, comprising:
    a plurality of antennas for transmitting radio frequency signals between the base station and a user equipment, wherein the user equipment comprises at least a first antenna and a second antenna for transmitting radio frequency signals between the user equipment and the base station; and a processing device configured to:
receive a first training signal sent from the user equipment to the base station via the first antenna of the user equipment at a first time period on a first communication channel;
determine a first configuration parameter configuring each antenna of a subset of the plurality of the antennas of the base station based on the first training signal received at the corresponding antenna;
receive a second training signal sent from the user equipment to the base station via the second antenna of the user equipment at a second time period different than the first time period on a second communication channel different than the first communication channel;
determine a second configuration parameter configuring each antenna of the subset of the plurality of the antennas of the base station based on the second training signal received at the corresponding antenna;
transmit first downlink data from the base station to the user equipment by the subset of the plurality of antennas of the base station being configured using the first configuration parameter, and simultaneously transmit second downlink data from the base station to the user equipment by the subset of the plurality of antennas of the base station being configured using the second configuration parameter; and
in response to the user equipment determining (i) a first signal quality parameter of the first downlink data received at the user equipment and (ii) a second signal quality parameter of the second downlink data received at the user equipment, and selecting, based on the determined first and second signal quality parameters, an antenna of the first and second antennas of the user equipment for a transmission of uplink data from the user equipment to the base station, receive at least one of (i) uplink data sent from the user equipment via the first antenna using the first configuration parameter of the subset of the plurality of antennas of the base station or (ii) uplink data sent from the user equipment via the second antenna using the second configuration parameter of the subset of the plurality of antennas of the base station.

10. A user equipment for a wireless radio network, the user equipment comprising:
at least a first antenna and a second antenna different than the first antenna, the first and second antennas for transmitting radio frequency signals between the user equipment and a base station, wherein the base station comprises a plurality of antennas for transmitting radio frequency signals between the base station and the user equipment; and
a processing device configured to:
send a first training signal to the base station via the first antenna at a first time period on a first communication channel;
send a second training signal to the base station via the second antenna at a second time period different than the first time period on a second communication channel different than the first communication channel;
receive via the first antenna of the user equipment first downlink data transmitted from the base station via one or more antennas of the base station configured using first configuration parameters determined by the base station based on the first training signal, and simultaneously receive via the second antenna of the user equipment second downlink data transmitted from the base station via one or more antennas of the base station being configured using second configuration parameters determined by the base station based on the second training signal;
determine a first signal quality parameter of the received first downlink data;
determine a second signal quality parameter of the received second downlink data;
select, based on the determined first and second signal quality parameters, an antenna of the first and second antennas of the user equipment for a transmission of uplink data from the user equipment to the base station; and
send, based on the determined first and second signal quality parameters, the uplink data to the base station using the selected antenna of the first and second antennas of the user equipment.

11. The user equipment according to claim 10, wherein the user equipment comprises at least one of a group consisting of a mobile telephone, a mobile computer, a personal digital assistant, and a tablet computer.

12. A method for transmitting data between a user equipment and a base station in a wireless radio network, wherein the user equipment comprises at least a first antenna and a second antenna for transmitting radio frequency signals between the user equipment and the base station, and wherein the base station comprises a plurality of antennas for transmitting radio frequency signals between the base station and the user equipment, the method comprising:
transmitting a first training signal from the user equipment to the base station via the first antenna of the user equipment at a first time period on a first communication channel;
determining a first configuration parameter for each antenna of a subset of the plurality of the antennas of the base station based on the first training signal received at the corresponding antenna;
transmitting a second training signal from the user equipment to the base station via the second antenna of the user equipment at a second time period different to the first time period on a second communication channel different from the first communication channel,
determining a second configuration parameter for each antenna of the subset of the plurality of the antennas of the base station based on the second training signal received at the corresponding antenna;
determining at the user equipment a first signal quality parameter of first downlink data received from the subset of the plurality of antennas of the base station being configured using the first configuration parameter;
determining at the user equipment a second signal quality parameter of second downlink data received from the subset of the plurality of antennas of the base station being configured using the second configuration parameter; and
selecting at the user equipment, based on the determined first and second signal quality parameters, an antenna of the first and second antennas of the user equipment for a transmission of uplink data from the user equipment to the base station.

* * * * *